United States Patent [19]

Sprague

[11] 3,920,529

[45] Nov. 18, 1975

[54] CONTROL OF ALKALI METAL CHLORATES IN MERCURY CELL BRINE

[75] Inventor: Ernest H. Sprague, Augusta, Ga.

[73] Assignee: Olin Corporation, New Haven, Conn.

[22] Filed: May 28, 1974

[21] Appl. No.: 473,620

[52] U.S. Cl. .............................................. 204/128
[51] Int. Cl.² .......................................... C25B 1/26
[58] Field of Search ............................. 204/128, 98

[56] References Cited
UNITED STATES PATENTS

| | | | |
|---|---|---|---|
| 2,787,591 | 4/1957 | Gardiner et al. | 204/125 |
| 3,052,612 | 9/1962 | Henegar et al. | 204/128 |

*Primary Examiner*—R. L. Andrews
*Attorney, Agent, or Firm*—Donald F. Clements; Thomas P. O'Day; James B. Haglind

[57] ABSTRACT

A process is described for controlling the concentration of alkali metal chlorate impurities in alkali metal chloride brines used in the electrolytic production of chlorine. The pH of the depleted alkali metal chloride brine is adjusted to within the range from about 7.5 to about 8.5, and then saturated with additional alkali metal chloride. After clarification, at least a portion of the resulting reconstituted brine is contacted with chlorine-containing blow-off gas from a chlorine liquification step, the pH of the reconstituted brine is adjusted to below about 5, and the thus treated brine is recycled to the electrolytic cells.

Adjusting the pH of the depleted brine to between about 7.5 and about 8.5 prior to reconstitution and prior to contact with blow-off gas helps to maintain the concentration of alkali metal chlorates in the resulting reconstituted brine to below about 4 grams per liter. Such a low alkali metal chlorate concentration in the brine markedly improves the efficiency of the electrolytic cell.

11 Claims, No Drawings

CONTROL OF ALKALI METAL CHLORATES IN MERCURY CELL BRINE

This invention relates to an improved method of operating electrolytic cells. More particularly, this invention relates to the method of reducing the concentration of alkali metal chlorates in reconstituted brine.

Electrolytic cells, both the diaphragm type and the mercury cell type have been used commercially for many years to produce chlorine by the electrolysis of brine. Usually the brine is an aqueous solution of sodium chloride but other alkali metal chlorides, such as potassium chloride and lithium chloride may be used to prepare the brine which is electrolized to obtain gaseous chlorine and an aqueous solution of alkali metal hydroxide.

In most commercial processes, chlorine gas produced by electrolysis is dried by any suitable technique, such as by contacting with sulfuric acid in a drying tower and the resulting dried chlorine gas is then condensed into liquid form and stored for use or sale. All of the gaseous material removed from the cells is not condensed, since it contains, after condensation, a minor portion of chlorine as well as a mixture of nitrogen, oxygen, chlorine, hydrogen and the like. This gas containing non-condensibles, frequently called "blow-off gas" or "sniff gas" is scrubbed in at least a portion of fresh or reconstituted brine which is capable of dissolving or separating most of the chlorine component from the blow-off gas. The blow-off gas, which has been depleted of most of the chlorine, is further processed to recover other values. The brine which has been enriched with chlorine, after desired pH adjustment, is then conveyed to the electrolytic cell for electrolysis of chlorine.

U.S. Pat. No. 3,052,612, which issued Sept. 4, 1962 to Glen P. Henegar et al, describes a process for scrubbing blow-off gas in this manner. In this process depleted brine from the electrolytic cell, after vacuum treatment to remove entrained chlorine gas, is contacted with additional salt to raise the concentration of salt in the brine to the desired level, for example, to about 310 grams per liter. After settling large solids and filtering suspended solids, the clarified enriched brine is admixed with dilute caustic solution to raise the pH of the brine from about 9.5 to 10.2. At least a portion of this alkaline brine solution is then fed to a stripper where the brine is contacted with blow-off gas containing chlorine. Following the separation of the chlorine in the stripper, the reconstituted brine enriched in chlorine is then contacted with hydrochloric acid to adjust the pH to below about 3 and is then recycled to the electrolytic cell.

As indicated in U.S. Pat. No. 2,787,591, which issued Apr. 2, 1957 to William C. Gardiner, et al, when the pH of the brine is adjusted to the range between about 1.7 and about 3.0, formation of undesirable by-products such as excessive hydrogen during electrolysis is suppressed.

Both of these patents, U.S. Pat. Nos. 3,052,612 and 2,787,591 are incorporated herein in their entirety. Recently, efforts have been made to minimize losses in mercury cell operations to prevent unnecessary leakage of brine or gaseous products which contain mercury. Not only is the loss of mercury an unnecessary expense of the process, but also under certain circumstances, the loss of mercury can be detrimental to the environment from a pollution standpoint. Therefore commercial mercury cell operations have been "tightened up" and leakage has been minimized. Although this operation has markedly reduced the amount of mercury lost from the electrolysis system, it has also caused a build up of undesirable impurities in the brine being electrolyzed, since the previous streams leaking out of the system also bled off undesirable impurities such as alkali metal chlorates. When electrolysis is carried out in the presence of high concentrations of alkali metal chlorates, such as sodium chlorate, the efficiency of the electrolysis is adversely affected. In addition the buildup of other impurities in the mercury cathode is increased.

There is need at the present time to provide a means of controlling the build-up of alkali metal chlorates in electrolytic cells in order to improve the efficiency of the electrolytic process.

It is a primary object of this invention to provide an improved electrolytic process for the production of chlorine from alkali metal chloride brines.

It is another object of this invention to provide a means of controlling the build-up of alkali metal chlorates in recycled brine used in the electrolytic process for the production of chlorine.

A further object of the invention is to provide an improved process for the electrolysis of chlorine from salt brine wherein the concentration of sodium chlorate is maintained at a low level in the recycled brine.

These and other objects of the invention will be apparent from the following detailed description thereof.

It has now been discovered that the foregoing objects are accomplished in a process for the production of chlorine by the electrolysis of an aqueous brine of an alkali metal chloride wherein the gaseous chlorine produced in electrolysis is cooled, dried and compressed to obtain chlorine in liquid form, and a blow-off gas is produced, after compressing and cooling said chlorine, which contains nitrogen and oxygen in porportions generally present in air, hydrogen and uncondensed chlorine. In the improvement of this invention, a major portion of the gaseous chlorine present in the blow-off gas is recovered by contacting the blow-off gas with reconstituted alkaline brine of an alkali metal chloride having a pH in the range from about 7.5 to about 8.5, whereby the pH of the brine after contact with said blow-off gas is reduced to below about 5. The resulting chlorine-enriched brine is returned to the electrolytic cell. In a preferred embodiment of the invention, the brine, after reconstitution and chlorine-enrichment is acidified to a pH of below about 3 before being fed to the electrolytic cell.

More in detail, the novel process of this invention is utilized in electrolytic cells of either the mercury cathode type or the diaphragm cell type. For purposes of illustration, the invention will be described as applied to a mercury cell process. However, one skilled in the art will recognize that this technique can readily be adopted to commercial diaphragm cell operations.

A typical process for the electrolysis of brine, the regeneration of depleted brine and the use of alkaline regenerated brine to scrub chlorine from blow-off gas is described in U.S. Pat. No. 3,052,612, which issued Sept. 4, 1952 to Henegar et al. This patent is incorporated herein completely by reference. A typical method of adjusting the pH of the regenerated chlorine-enriched brine prior to recirculating through the electrolytic cell for electrolysis is disclosed in U.S. Pat. No. 2,787,591, which issued Apr. 2, 1957 to Gardiner et al.

This patent is incorporated herein by reference in its entirety.

In the operation of an electrolytic chlorine plant using mercury cells, the weak brine effluent from the cells, partially depleted of salt content and saturated with chlorine, is ordinarily reconstituted for recycle to the cells by a series of processing steps. First the depleted brine is subjected to dechlorination, generally by applying a vacuum to the brine and steam heating, which causes vaporization of chlorine from the brine. The chlorine removed in this manner is combined with the gaseous chlorine produced in the electrolytic cells and liquified, as described more fully below.

Since undesirable impurities, particularly iron and other metals are introduced as contaminents with the solid salt, it is desirable to precipitate these impurities before feeding the brine to the electrolysis cell. Generally this is done by addition to the depleted brine of an alkaline material such as sodium hydroxide, sodium carbonate, boron carbonate, or mixtures thereof. If potassium chloride or lithium chloride is electrolyzed, the corresponding potassium or lithium compounds are preferably used as the alkaline compound. Sufficient alkaline material is admixed with the depleted brine to adjust the pH within the range from about 7.5 to about 8.5 and preferably from about 8.0 to about 8.5. Within these pH ranges the free alkali concentration is generally less than about 0.05 grams per liter of free alkaline material in the depleted brine. When the alkaline material is added to the depleted brine in a proportion to adjust the pH above about 8.5, alkali metal chlorate forms in the brine in a proportion that exceeds desired levels. As a result, the operation of the cell becomes less efficient. If only sufficient alkaline material is added to the depleted brine to adjust the pH below about 7.5, there is insufficient precipitation of iron and other metal contaminents and therefore the purification step is inefficient and results in an undesirable operation of the electrolytic cell. The alkaline material used to adjust the pH, as described above, is preferably an aqueous solution of sodium hydroxide having a concentration within the range from about 15 to about 25%, and preferably from about 18 to about 22 percent by weight. The other alkaline materials give satisfactory results, but these materials are generally not available in chlorine-caustic commercial operations. Since the caustic material is one of the by-products of the process it is less expensive to use the aqueous caustic solution to precipitate metal impurities and to adjust the pH of the depleted brine to within the desired range.

The resulting alkaline brine is then admixed with sufficient solid alkali metal chloride to saturate the brine.

Generally sodium chloride is used to form the brine used in electrolysis, but other alkali metal salts such as potassium chloride and lithium chloride can also be used to form the brine used in the electrolysis process for preparing chlorine.

In order to purify the resulting reconstituted brine, solids are removed by settling initially and then suspended finely divided particles are removed by filtration. The resulting clarified reconstituted brine is then used, at least in part, to recover most of the chlorine from blow-off gases, as described more fully below.

Chlorine produced by electrolysis in the electrolytic cells is collected and admixed with the chlorine obtained by vacuum dechlorination of the depleted brine. The combined chlorine gas stream is then conveyed to a suitable heat exchanger to cool the chlorine gas to a temperature in the range from about 10°C to about 20°C. The cooled gas is then fed to a drying tower where it is contacted in counter-current flow with an aqueous sulfuric acid solution which removes moisture from the chlorine gas. The dried chlorine gas is then compressed in one, and preferably at least two, compression stages to effect liquification of the chlorine gas. The liquid chlorine gas is conveyed to storage or tank car for shipment. Non-condensed gases recovered from the chlorine liquification step, generally referred to as blow-off gases, contain air which has been sucked into the cells by the vacuum system during electrolysis and also contains hydrogen formed as a side reaction during electrolysis. In addition, a substantial quantity of chlorine gas is present as well as carbon dioxide and other gases in minor quantities. As indicated in U.S. Pat. No. 3,052,612, at least a portion of the purified alkaline brine is used to contact the blow-off gases in counter-current flow in a suitable packed tower to remove chlorine from the blow-off gas and recover it in the regenerated brine. In the process of this invention, the reconstituted brine having a pH in the range from about 7.5 to about 8.5 is used to contact the blow-off gas. Sufficient alkaline brine is used to absorb substantially all of the chlorine from the blow-off gas. Thus all or a portion of the reconstituted alkaline brine can be used for this purpose, depending upon the chlorine concentration in the blow-off gas. During the absorption process, the alkalinity of the brine used in the stripping column is neutralized fully or in part by the chlorine component of the blow-off gas. Chlorine is recovered in the brine by reacting with the caustic component of the brine in accordance with the following equation:

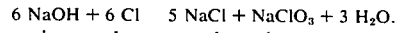
6 NaOH + 6 Cl  5 NaCl + NaClO₃ + 3 H₂O.

Thus it can be seen that the greater proportion of caustic present in a brine, the greater amount of sodium chlorate that is formed. In addition, when the pH of the reconstituted brine is controlled within the above identified range, there is improved flocculation of the iron containing precipitate in the reconstituted brine, which is more easily separated by settling and filtration in the preparation of the clarified brine. Furthermore, when the proportion of alkaline material is added to control the pH of the depleted brine in the above identified range, less acid is required to prepare the reconstituted brine for recycling to the electrolytic cells.

The pH of the alkaline brine used to scrub the chlorine from the blow-off gas is generally reduced to below about 5 by extracting most of the chlorine from the blow-off gas during the stripping operation. The resulting chlorine enriched regenerated brine is combined with any alkaline reconstituted brine not used in the stripping operation and the pH of the resulting mixture is adjusted to about 3 or below. An aqueous hydrochloric acid solution is generally used to adjust the pH within from about 1.7 to about 3, as described in U.S. Pat. No. 2,787,591. The resulting acidified chlorine enriched reconstituted brine is then conveyed to the electrolytic cell for electrolysis.

When the blow-off gas is contacted with alkaline reconstituted brine in accordance with the process of this invention at a pH in the range of from about 7.5 to about 8.5, the chlorate produced by the reaction of the chlorine with free alkali is on the order of about 0.01 grams per liter. However, when scrubbing of the blow-off gas occurs with alkaline reconstituted brine having a pH of above about 9.5, the chlorate content is on the order of about 0.1 grams per liter. Thus it can be seen that adjusting the pH within the range of about 7.5 to about 8.5 in accordance with this invention maintains the chlorate concentration in the recycled brine at levels which are below prior art techniques by a factor of about 10.

Scrubbing of the blow-off gases and alkaline brine in accordance with the process of this invention is generally done at ambient temperatures and pressures. The brine temperature may range from about 15°C to about 85°C and preferably from about 55°C to about 65°C. The absorption column preferably utilizes diffusion plates but may utilize packing such as Raschig rings. However, any other conventional packing or other gas-liquid mixing means suitable to obtain maximum contact between the alkaline brine and the blow-off gas may be used.

The following example is presented to define the invention more fully without any intention of being limited thereby.

EXAMPLE

A vertical polyester tower having an inside diameter of about 8 feet and a height of about 66 feet was fitted with a brine inlet and a gas outlet at the top and a brine outlet and a gas inlet at the bottom. The tower was fitted with horizontal distribution plates positioned about 2 feet apart. Sodium chloride brine having a pH of about 8 and a sodium chloride concentration of about 310 grams per liter was introduced at the top of the column in the brine inlet.

The brine was obtained by dechlorination of depleted brine from the electrolytic cell which had reached equilibrium after continuous cell operation in which the sodium chlorate concentration was about 2.5 grams per liter. Dechlorination was effected by first subjecting the depleted brine to vacuum and steam heat dechlorination. After removing chlorine with vacuum and heat the pH of the depleted brine was adjusted to about 8 by adding an aqueous solution of sodium hydroxide having a concentration of about 20% by weight. The free alkali concentration was below about 0.05 grams per liter in the alkaline brine. After pH adjustment the alkaline brine was passed through a saturator where it dissolved sufficient salt to raise the salt concentration to about 310 grams per liter. The resulting reconstituted brine was then conveyed to a settler whereby large particles of solids were settled and the brine containing suspended solids was filtered. The resulting clarified alkaline brine was then fed to the brine inlet of the tower at a rate of about 1700 gallons per minute.

Blow-off gas produced by compressing and liquifying chlorine from the electrolytic cell was fed to the gas inlet at the bottom of the column. The blow-off gas contained about 10% by volume of chlorine, the remainder being air and hydrogen. The feed rate of the blow-off gas was approximately 250 cubic feet per minute at the bottom of the absorption tower.

Brine containing dissolved chlorine from the blow-off gas was removed from the brine outlet at the bottom of the column. The pH of the chlorine-enriched outlet brine was approximately 4.5. Chlorine retained in the exit gas from the gas outlet at the top of the tower ranged from about 3 to 5% by volume. The outlet brine containing dissolved chlorine was then admixed with hydrochloric acid to adjust the pH to about 2.5. The sodium chlorate content of the reconstituted brine was about 2.5 grams per liter.

For purposes of comparison the procedure was repeated except that the brine introduced at the top of the tower had a pH of about 9.5. After acidification of the reconstituted chlorine containing brine by admixing hydrochloric acid with the brine to adjust the pH to below about 3, the sodium chlorate content of the resulting acidified brine was found to be in the range from about 18 to about 25 grams per liter, which was approximately 7 to 10 times as high as the concentration of sodium chlorate in the brine prepared in accordance with the process of this invention.

What is claimed is:

1. In a process for preparing chlorine by electrolysis wherein
  a. an aqueous brine of an alkali metal chloride is electrolyzed to produce
    1. chlorine and
    2. a depleted brine,
  b. said depleted brine is admixed with an alkaline compound to form an alkaline brine, and
  c. an uncondensed blow-off gas containing chlorine is separated from said chlorine,
  d. the resulting alkaline brine is resaturated with said alkali metal chloride,
  e. and after separation of the resulting solids from the saturated brine, at least a portion of said alkaline saturated brine is admixed with said blow-off gases to recover chlorine therefrom,
the improvement which comprises
  adjusting the pH of said alkaline depleted brine to within the range of from about 7.5 to about 8.5 prior to said saturation.

2. The process of claim 1
  a. wherein an aqueous acidic brine of an alkali metal chloride is electrolyzed to produce
  b. chlorine gas which is
    1. cooled
    2. dried and
    3. compressed to form
      a. liquid chlorine and
      b. uncondensed blow-off gas containing uncondensed chlorine, and a
  c. depleted aqueous acid brine which is
    1. dechlorinated,
    2. the resulting dechlorinated brine solution is admixed with sufficient alkaline compound to precipitate solid impurities,
    3. the resulting alkaline brine is admixed with additional alkali metal chloride to form an alkaline saturated brine solution thereof,
    4. separating solids from said alkaline saturated brine solution,
    5. contacting at least a portion of the resulting clarified alkaline saturated brine solution with said blow-off gas to remove said uncondensed chlorine therefrom,
    6. acidifying the resulting chlorine-enriched saturated brine solution and
    7. recycling the resulting acidified chlorine-enriched saturated brine solution to said electrolytic cell,
the improvement which comprises adjusting the pH of said dechlorinated brine solution to within the range from about 7.5 to about 8.5 prior to saturation and prior to contacting with said blow-off gas.

3. The process of claim 2 wherein said pH is from about 8.0 to about 8.5.

4. The process of claim 3 wherein said alkaline compound is an aqueous solution of sodium hydroxide.

5. The process of claim 4 wherein said acidic brine is acidified with hydrochloric acid to a pH in the range from about 1.7 to about 3.

6. The process of claim 5 wherein all of said alkaline saturated brine solution is contacted with said blow-off gases.

7. The process of claim 3 wherein said alkaline compound is sodium carbonate.

8. The process of claim 2 wherein said alkali metal chloride is sodium chloride.

9. The process of claim 1 wherein said alkali metal chloride is sodium chloride.

10. The process of claim 9 wherein said pH is from about 8.0 to about 8.5.

11. The process of claim 10 wherein said alkaline compound is an aqueous solution of sodium hydroxide.

* * * * *